J. CORKERY.
AUTOMATIC COUPLING.
APPLICATION FILED JULY 8, 1912.

1,102,245.

Patented July 7, 1914.
2 SHEETS—SHEET 1.

Witnesses
N. Davis
C. Patenaude

Inventor.
J. Corkery
by C. J. Fetherstonhaugh
Atty

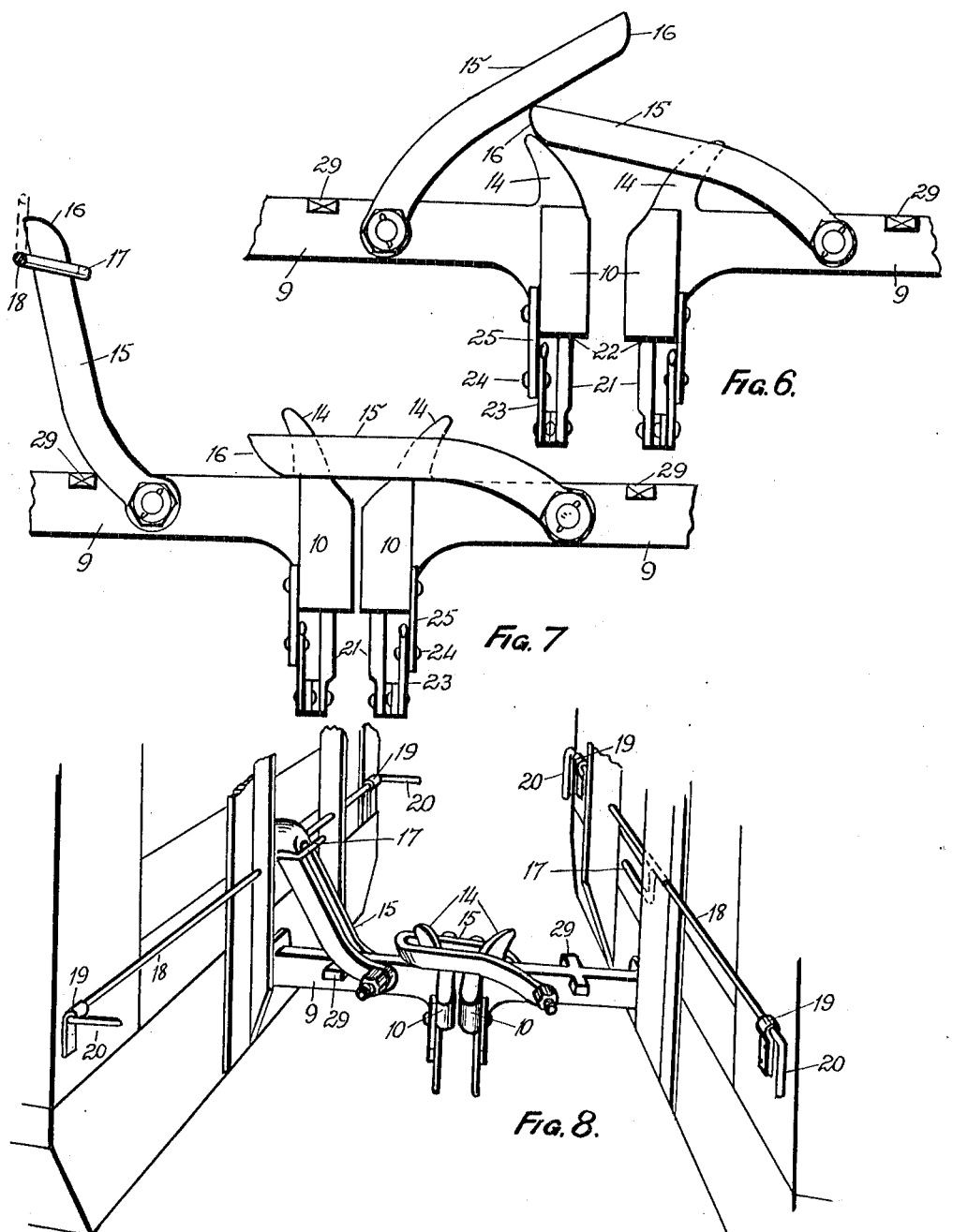

UNITED STATES PATENT OFFICE.

JOHN CORKERY, OF ROCKDALE, NEW SOUTH WALES, AUSTRALIA.

AUTOMATIC COUPLING.

1,102,245. Specification of Letters Patent. Patented July 7, 1914.

Application filed July 8, 1912. Serial No. 708,102.

*To all whom it may concern:*

Be it known that I, JOHN CORKERY, a subject of the King of Great Britain and Ireland, residing at King street, Rockdale, in the State of New South Wales, Commonwealth of Australia, have invented certain new and useful Improvements in Automatic Couplings, of which the following is a specification.

The object of the present invention is the provision of improved means for automatically coupling railway vehicles and the like of the class having at each end a centrally disposed buffer; and, furthermore, for releasing the coupling mechanism without the necessity for the operator or shunter passing between the ends of the coupled vehicles.

Figure 1:
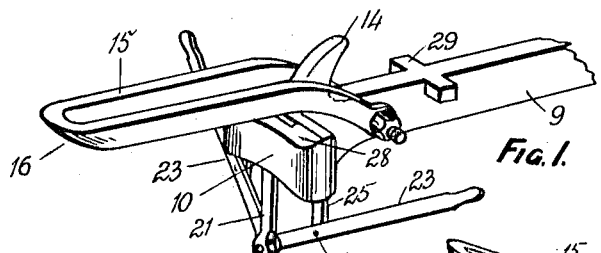
Figure 2:
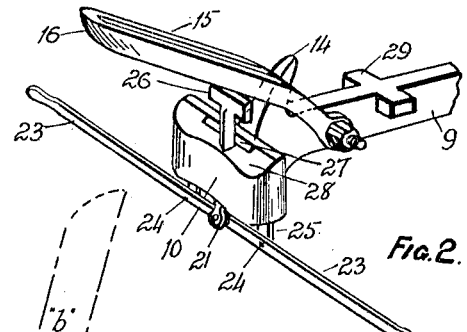
Figure 3:
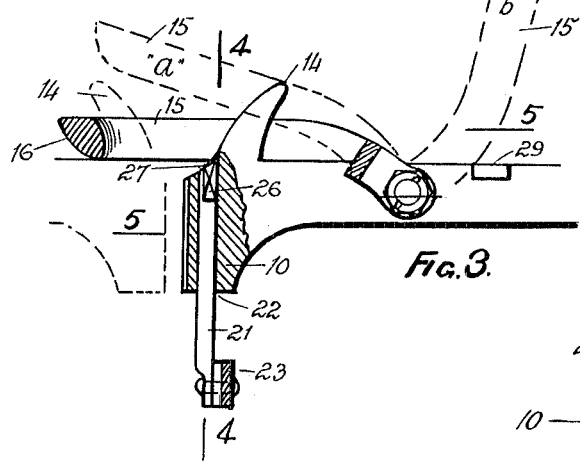
Figure 4:
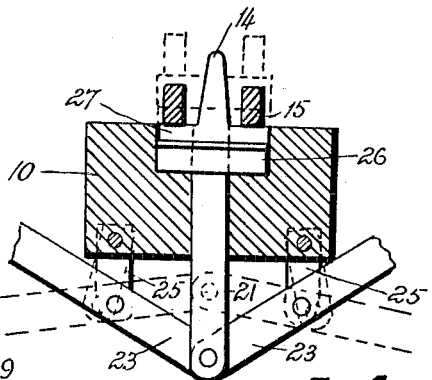
Figure 5:
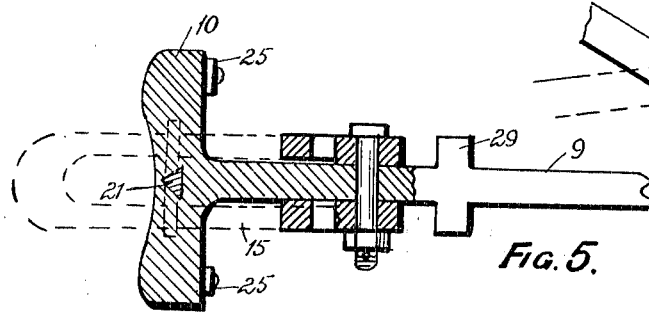

Referring to the accompanying drawings depicting coupling construction in accordance with the present invention:

Figure 1 is a perspective view of coupling device in the normal and ready-to-couple position, Fig. 2 being a similar view in the raised and released position. Fig. 3 is a part sectional elevation, showing the coupling link in operative engagement with the hook of an adjacent car and also showing in dotted lines the link in two inoperative positions, and Figs. 4 and 5 are sections on line 4—4 and 5—5 respectively of Fig. 3. Figs. 6 and 7 are side elevations of opposing couplings just prior to effecting the coupling and in the coupled positions respectively. Fig. 8 is a perspective view of the opposing ends of two vehicles with coupling devices attached and in the coupled position.

Each of the draw-bars 9 positioned centrally and at each end of a vehicle has a terminal buffer 10 the outer and vertical face of which is slightly concave so that when opposing buffers impact the contact is not made upon the center with possibility of jamming the lifting rod. This construction is shown in Fig. 5, the concavity being exaggerated to more clearly illustrate the construction. Rearwardly of each of the buffers 10 and on the upper edge of each of the draw bars 9 is positioned the draw bar hook 14 curved toward its carrying vehicle for the purpose hereinafter specified. The coupling link 15 carried by each draw bar 10 is pivotally attached thereto rearwardly of the draw bar hook 14 and is U-shaped horizontally the free end 16 sloping in the opposite direction to that of the hook 14 carried upon the same draw bar, so that in the event of the free end 16 of the link 15 striking the outer edge of the opposing hook 10 it will ride up and over the same and effect coupling.

When required to retain a coupling link 15 out of operation it is secured against the end of the vehicle carrying same by the angular offset 17 of a bar or rod 18 positioned transversely on the end of the vehicle and passing through bearings 19 and having a terminal handle 20 at each end (see Fig. 8). The rod 18 is of sufficient length to allow of a slidable movement of same for the purpose of allowing the offset 17 to be drawn clear of the coupling link 15 and is also partly rotatable so that said offset 17 being firstly moved under the link may then be utilized to throw the link forward into the position shown in Fig. 1.

For releasing the coupling link 15 from engagement with its opposite draw bar hook a vertically reciprocable bar is provided in each buffer 10, having a shank 21 passing freely through vertical aperture 22 of corresponding shape in buffer. The lower end of this shank 21 has pivotally connected thereto one end of each of the hand levers 23 positioned transversely of the vehicle ends and extended to be manually operated at the side of the vehicle. These levers 23 are each fulcrumed as at 24 to the end of one of a pair of pivoted links 25 which links 25 depend from the bottom edge of the buffer 10. The rectangular head 26 of the releasing bar mentioned is in the normal position seated in the recess 27 in the top edge of the buffer 10 which edge is chamfered as at 28 for the purpose hereinafter stated.

In use, when vehicles to be coupled are brought together, both coupling links may be in the operative position and their ends may contact in which case both links will be forced upward until one or the other by reason of its slightly greater weight or other slight and accidental difference in construction will drop into the operative position, but it is extremely unlikely that the links will contact in such a manner, as a difference of level of the drawbars or of the ends of the links is practically inevitable and one will force itself underneath the other and opposing link 15 (see Fig. 6) and when the buffers 10 contact or approach each other very closely the link 15 will engage with draw bar hook 14 on the draw bar 9 of the opposing vehicle. Where one of the links 15 is held out of action by the offset 17 of the rod 18 (see Figs. 6 and 8) the link forcing operation described will obviously not occur. Where the approaching draw bars 9 have a difference of level and the lower of the coupling links 15 effects the coupling it will strike the outer curved face of the hook 14 on the opposing draw bar and will (by reason of the opposite curvature of its free end 16) ride up and over same; again, it may strike even lower than on the face mentioned, in which case it will impact on the chamfered portion 28 of the opposing buffer 10 causing it to ride up same to the curved face of the opposing hook 14 up which it will ride and falling over the top of same will effect the coupling. To release coupled vehicles it is only necessary for the shunter or operator to depress that one of the hand levers 23 that is most conveniently positioned to hand, when the releasing bar in the buffer 10 will be forced upwardly the head 26 of same forcing up the overlying link 15 and releasing same (see dotted position "*a*", Fig 3) and by sharply depressing the lever 23 the link 15 will be thrown over into dotted position "*b*" Fig. 3 and against the end of the vehicle carrying same, the link 15 bearing on stops 29 positioned on each of the drawbars 10 rearwardly of the pivot of said links 15.

What I claim and desire to secure by Letters Patent is:—

An automatic coupling for railway vehicles comprising in each member a draw bar head centrally depressed and immediately behind said depression provided with a crosshead recess and a rodhole leading downwardly therefrom, said bar having behind said head a rearwardly curved hook, beyond said hook a cross bar forming a bracket, a longitudinally bent link spanning said draw bar between said cross bar and said hook and pivotally secured thereto, a rod having a cross head which has a bearing on the underside of said link at the upper end and extending downwardly through said rod hole and levers pivotally secured to said rod at the lower end thereof and extending laterally, said levers being pivotally supported from the draw bar intermediate of their length.

In testimony whereof I affix my signature in presence of two witnesses.

JOHN CORKERY.

Witnesses:
WILLIAM NEWTON,
JOHN P. BRAY.

---

Copies of this patent may be obtained for five cents each, by addressing the "Commissioner of Patents, Washington, D. C."